(12) United States Patent
Gottlieb

(10) Patent No.: US 8,647,206 B1
(45) Date of Patent: Feb. 11, 2014

(54) SYSTEMS AND METHODS FOR INTERFACING VIDEO GAMES AND USER COMMUNICATIONS

(75) Inventor: Steven M. Gottlieb, New York, NY (US)

(73) Assignee: Shindig, Inc., New York, NY (US)

(*) Notice: Subject to any disclaimer, the term of this patent is extended or adjusted under 35 U.S.C. 154(b) by 827 days.

(21) Appl. No.: 12/688,631

(22) Filed: Jan. 15, 2010

Related U.S. Application Data

(60) Provisional application No. 61/145,107, filed on Jan. 15, 2009.

(51) Int. Cl.
*G06F 17/00* (2006.01)

(52) U.S. Cl.
USPC .............................. 463/40; 463/43

(58) Field of Classification Search
USPC ...................... 463/40–42; 348/143
See application file for complete search history.

(56) References Cited

U.S. PATENT DOCUMENTS

| | | | |
|---|---|---|---|
| 6,241,612 B1 | 6/2001 | Heredia | |
| 2007/0265074 A1 | 11/2007 | Akahori et al. | |
| 2008/0274810 A1 | 11/2008 | Hayashi et al. | |
| 2009/0209339 A1 | 8/2009 | Okada | |
| 2010/0026780 A1* | 2/2010 | Tico et al. | 348/14.02 |
| 2010/0026802 A1* | 2/2010 | Titus et al. | 348/143 |
| 2011/0164141 A1* | 7/2011 | Tico et al. | 348/207.99 |

FOREIGN PATENT DOCUMENTS

| | | |
|---|---|---|
| GB | 2446529 A | 8/2008 |
| WO | 2009077936 A2 | 6/2009 |

OTHER PUBLICATIONS

Miyoshi et al., "Input device using eye tracker in human-computer interaction," Robot and Human Interactive Communication, 2001 Proceedings, 10th IEEE International, pp. 580-585.
Robin Wauters, "6rounds Launches Video Communication Platform With Several Layers of Fun," TechCrunch, Jun. 30, 2009, pp. 1-2, http://techcrunch.com/2009/06/30/6rounds-launches-video-communication-platform-with-several-layers-of-fun/, accessed on Feb. 10, 2010.
"6rounds has officially launched!" 6rounds.com Blog, Jul. 3, 2009, pp. 1-4, http://blog.6rounds.com/official-launch-video-chat-website/, accessed on Feb. 10, 2010.
"The GixOO Team on TV!" 6rounds.com Blog, Sep. 22, 2008, pp. 1-4, http://blog.6rounds.com/gixoo-tv-coverage-startup-factory/, accessed on Feb. 10, 2010.
"Make friends online and enjoy free webcam chats," 6rounds.com, 2009, p. 1, http://blog.6rounds.com/about/, accessed on Feb. 10, 2010.
About TokBox, Inc., All about TokBox, http://www.tokbox.com/about, retrieved Feb. 4, 2011, p. 1.
CrunchBase Profile, CrunchBase readeo, http://www.crunchbase.com/company/readeo, retrieved Feb. 3, 2011, pp. 1-2.
CrunchBase Profile, CrunchBase Rounds, http://www.crunchbase.com/company/6rounds, retrieved Feb. 4, 2011, pp. 1-2.
CrunchBase Profile, CrunchBase TokBox, http://www.crunchbase.com/company/tokbox, retrieved Feb. 4, 2011, pp. 1-3.
Oneline Collaboration GoToMeeting, http://www.gotomeeting.com/fec/online_collaboration, retrieved Feb. 4, 2011, pp. 1-4.
Readeo Press Release, www.mmpublicity.com, Feb. 25, 2010, pp. 1-2.
Rounds.com, Make friends online and enjoy free webcam chats, http://www.rounds.com/about, retrieved Feb. 4, 2011, pp. 1-3.

\* cited by examiner

*Primary Examiner* — Masud Ahmed
(74) *Attorney, Agent, or Firm* — Kramer Levin Naftalis & Frankel LLP

(57) ABSTRACT

Systems and methods for interfacing video games and user communications are provided. Communications amongst users can affect a video game provided to the users. For example, communications can be monitored to determine when a video game event occurs and then a video game event can be generated. Moreover, one or more aspects of the video game can affect communications amongst the users. For example, the active user of a video game may be used to adjust the prominence of communications amongst the users.

31 Claims, 7 Drawing Sheets

SYSTEMS AND METHODS FOR INTERFACING VIDEO GAMES AND USER COMMUNICATIONS

CROSS-REFERENCE TO RELATED APPLICATIONS

This application claims the benefit of U.S. Provisional Application No. 61/145,107, filed Jan. 15, 2009, the disclosure of which is incorporated by reference herein in its entirety.

Co-pending U.S. patent application Ser. No. 12/624,829, entitled "MULTIPARTY COMMUNICATIONS SYSTEMS AND METHODS THAT UTILIZE MULTIPLE MODES OF COMMUNICATION" and filed on Nov. 24, 2009, which issued as U.S. Pat. No. 8,405,702 on Mar. 26, 2013, are both hereby incorporated by reference herein in their entirety.

Co-pending U.S. patent application Ser. No. 12/624,840, entitled "MULTIPARTY COMMUNICATIONS SYSTEMS AND METHODS THAT OPTIMIZE COMMUNICATIONS BASED ON MODE AND AVAILABLE BANDWIDTH" and filed on Nov. 24, 2009, which issued as U.S. Pat. No. 8,390,670 on Mar. 5, 2013, are both hereby incorporated by reference herein in their entirety.

Co-pending U.S. patent application Ser. No. 12/624,848, entitled "MULTIPARTY COMMUNICATIONS SYSTEMS AND METHODS THAT EMPLOY COMPOSITE COMMUNICATIONS" and filed on Nov. 24, 2009, is hereby incorporated by reference herein in its entirety.

BACKGROUND OF THE INVENTION

Some traditional video game systems can function alongside a communications system (e.g., a chat or instant messaging application), but the two systems do not traditionally interact with each other. When operating alongside each other in an uncoordinated manner, video game systems and communications systems have several shortcomings. For example, communications between users can interfere with a video game or vice-versa. As another example, a user may be able to cheat by communicating with other users to share information about a video game.

In yet another example of the lack of coordination, traditional video game systems often require a user to provide inputs that are not part of natural communications between users (e.g., chat, conversation, or any other generalized communication between the users). A traditional video game system may require a user to provide a specific type of input to the system (e.g., pushing a button on a controller) and that input may have no other purpose besides controlling the video game. Accordingly, a user must inefficiently provide inputs to the video game that may not be part of natural communications between users (e.g., chat, conversation, or any other generalized communications that occur between users in real-life gameplay). Moreover, providing specific inputs to the video game system may conflict with or otherwise interrupt natural communications between users.

SUMMARY OF THE INVENTION

Systems and methods for interfacing video games and user communications are provided. Communications amongst users can affect a video game provided to the users. For example, communications can be monitored to determine when a video game event occurs and then a video game event can be generated. Moreover, one or more aspects of the video game can affect communications amongst the users. For example, the active user of a video game may be used to adjust the prominence of communications amongst the users.

In some embodiments, video game inputs can be generated based on communications between users are provided. The communications may be monitored to determine when a video game event occurs. For example, communications representing a video game event may include when a player says an answer to a question in a quiz game or when a player says "raise" and/or makes a predetermined motion (e.g., a signal) to indicate that he is raising a bet in a poker game. A system may monitor communications of one or more media (e.g., text, audio, or video) to determine when a game event occurs. The system can then generate a video game input based on the communications in response to determining that a video game event has occurred.

In some embodiments, communications between users can be modified based on a video game. Communications between users may be modified so that the prominence of different communications corresponds to each communication's importance in the context of the video game. For example, a video game may be turn-based and communications from a user whose turn it is may be modified to be more prominent than other communications.

In some embodiments, a system may limit communications between players or communications between players and non-players when a video game is provided. For example, a system may limit communications to prevent players from cheating when playing the video game.

In some embodiments, a system may monitor the activity of one or more user devices while providing a video game to determine if the user is attempting to bypass the regulated communication channels to communicate with other users. For example, a system may monitor the device's inputs (e.g., microphone and/or keyboard) and active software applications to determine if a user is attempting to cheat by communicating with other users.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

In accordance with the disclosure, a communications system may facilitate communications between users while the users play video games. For example, users may conduct natural communications while playing a video game.

Figure 1:
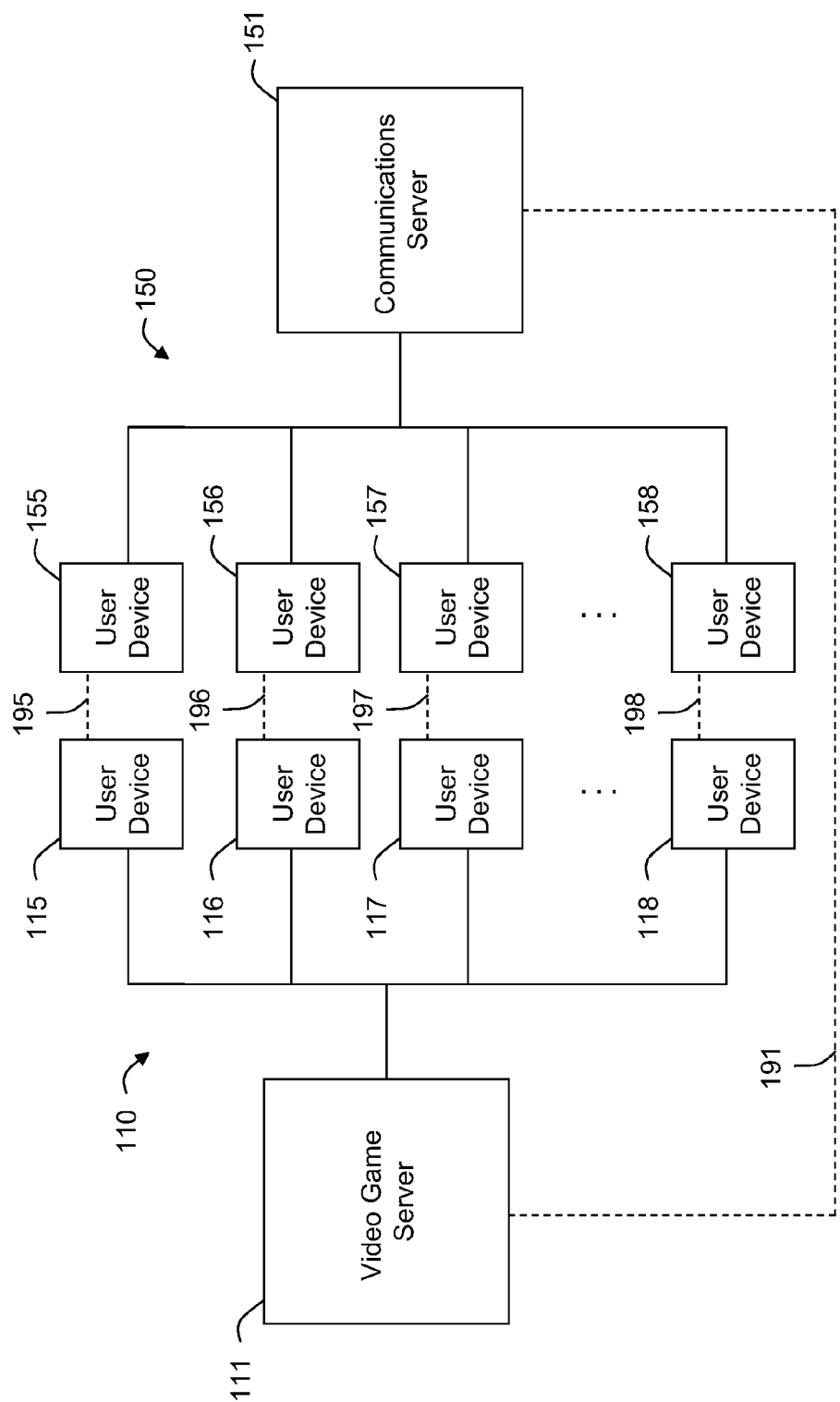
FIG. 1 is a schematic view of an illustrative video game system and an illustrative communications system in accordance with one embodiment of the invention.

In some embodiments, a communications system may be coupled with a separate video game system. For example, a communications system may be coupled with a separate video game system using a wired network (e.g., using Ethernet) and/or wireless network (e.g., using an 802.11 protocol). FIG. 1 may include video game system 110 and communications system 150.

Video game system 110 may include at least one video game server 111. Video game server 111 can be any suitable server for controlling video games played by one or more users. For example, server 111 may include several interconnected computers running software to control video games.

Video game system 110 may include several user devices 115-118. Video game server 111 may be coupled with user devices 115-118 through any suitable network. For example, server 111 may be coupled with user devices 115-118 through Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof. Each of user devices 115-118 may include an electronic device (e.g., a personal computer or a personal video game system). In some embodiments, each user device may correspond to a single user. For example, user device 115 may correspond to a first user and user device 116 may correspond to a second user. Server 111 may control single-player or multi-player video games provided through user devices 115-118. For example, server 111 may control a single-player video game played by the user of device 115 and/or a multi-player video game played by the users of devices 116-118. Each user device may provide outputs to a user and receive inputs from the user when providing a video game. For example, a user device may include one or more output interfaces (e.g., display screen or audio output) for providing video game outputs to a user and one or more input interfaces (e.g., a controller, joystick, keyboard, or mouse) for receiving video game inputs from a user.

In some embodiments, a user device may include, or be coupled with, hardware specifically designed for providing outputs and receiving inputs associated with a particular video game. For example, a user device may include or be coupled with game equipment that is specific to the video game a user is playing. Such game equipment may provide outputs to the user as gameplay progresses and receive inputs from the user. As an illustrative example, a user device may include, or be coupled with, an electromechanical or electro-optical chess board so that the system can position chess pieces on the board to visualize the current state of the game, including movements made by the other user. Continuing the example, the user can move chess pieces on the board to provide an input to the system. While the previous example was provided in the context of a chess video game, it is understood that suitable hardware corresponding to any type of game can be provided in accordance with the disclosure.

Communications system 150 may include at least one communications server 151. Communications server 151 can be any suitable server for facilitating communications between two or more users. For example, server 151 may include several interconnected computers running software to control communications.

Communications system 150 may include several user devices 155-158. Communications server 151 may be coupled with user devices 155-158 through any suitable network. For example, server 151 may be coupled with user devices 155-158 through Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof. Each of user devices 155-158 may include an electronic device (e.g., a personal computer or a personal communications system). In some embodiments, each user device may correspond to a single user. For example, user device 155 may correspond to a first user and user device 156 may correspond to a second user. Server 151 may control communications between two or more of the user devices. For example, server 151 may control one-to-one communications between user device 155 and 156 and/or multi-party communications between user device 155 and user devices 156-158. Each user device may provide outputs to a user and receive inputs from the user when facilitating communications. For example, a user device may include one or more output interfaces (e.g., display screen or audio output) for providing communication outputs to a user and one or more input interfaces (e.g., a controller, joystick, keyboard, or mouse) for receiving communication inputs from a user.

In some embodiments, video game system 110 may be coupled with communications system 150 using one or more links between servers. For example, link 191 may couple video game server 111 with communications server 151. Link 191 may be a wireless or wired coupling of server 111 and server 151. In some embodiments, link 191 may be an internet connection between server 111 and server 151.

In some embodiments, video game system 110 may be coupled with communications system 150 using one or more links between user devices. For example, link 195 may couple user device 115 with user device 155. A link may be a wireless (e.g., Bluetooth®) or wired (e.g., Universal Serial Bus) coupling of the two devices. In some embodiments, a link may be created by a user (e.g., by physically connecting the two devices or by configuring the two devices to communicate wirelessly). In some embodiments, a link may be automatically created by the video game device and the communications device. It is understood that any number of links between user devices may be used to couple video game system 110 with communications system 150. For example, links 195-198 may be used to couple each user device of video game system 110 with each user device of communications system 150.

It is understood that a video game system may be coupled with a communications system through one or more links between servers (e.g., link 191), one or more links between user devices (e.g., links 195-198), or a combination of links between servers and links between user devices.

While only one video game server, four video game user devices (e.g., devices 115-118), one communications server, and four communications user devices (e.g., devices 155-158) are shown in FIG. 1, it is understood that any number of servers and user devices can be provided.

Figure 2:
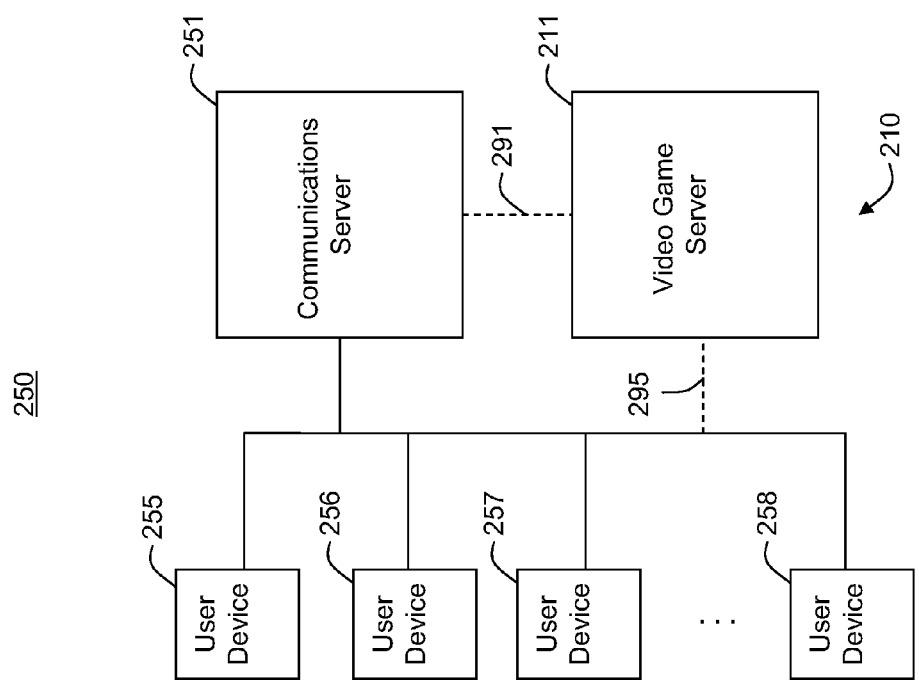
FIG. 2 is a schematic view of an illustrative video game system and an illustrative communications system in accordance with one embodiment of the invention.

In some embodiments, a communications system may include a video game system for providing video games to users. For example, a communication system can be deployed with its own selection of game interfaces, game applications, game servers, or any combination thereof. In some embodiments, a video game system may be incorporated into a communications system. FIG. 2 may include video game system 210 incorporated into communications system 250.

Communications system 250 may include communications server 251. Server 251 may be substantially similar to server 151 of FIG. 1, and the previous description of the latter can be applied to the former. Communications system 250 may also include several user devices 255-258. Communications server 251 may be coupled with user devices 255-258 through any suitable network. For example, server 251 may be coupled with user devices 255-258 through Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof. Each of user devices 255-258 may include an electronic device (e.g., a personal computer, an entertainment center, or a portable electronic device). In some embodiments, each user device may correspond to a single user. For example, user device 255 may correspond to a first user and user device 256 may correspond to a second user. Server 251 may control communications between two or more of the user devices. For example, server 251 may control one-to-one communications between user device 255 and 256 and/or multi-party communications between user device 255 and user devices 256-258. Each user device may provide outputs to a user and receive inputs from the user when facilitating communications. For example, a user device may include one or more output interfaces (e.g., display screen or audio output) for providing communication outputs to a user and one or more input interfaces (e.g., a controller, joystick, keyboard, or mouse) for receiving communication inputs from a user.

Communications system 250 can include video game system 210. Video game system 210 can include video game server 211. Video game server 211 can be any suitable server for controlling video games played by one or more users of communications system 250. For example, server 211 may include several interconnected computers running software to control video games.

Instead of providing separate user devices for video games, video game system 210 may employ user devices 255-258 from communications system 250. Server 211 may control single-player or multi-player video games provided through user devices 255-258. For example, server 211 may control a single-player video game played by the user of device 255 and/or a multiplayer video game played by the users of devices 256-258. Each user device may provide outputs to a user and receive inputs from the user when providing a video game. In some embodiments, the same user interfaces of each device may be used to facilitate communications and video games. For example, each user device may provide video game outputs to a user through the same user interface (e.g., display screen or audio output) that provides communication outputs to the user. Continuing the example, each user device may receive video game inputs from a user through the same user interface (e.g., a controller, joystick, keyboard, mouse, microphone or camera) that receives communication inputs from the user.

Video game system 210 may couple with communications system 250 using one or more links. In some embodiments, link 291 may couple video game server 211 with communications server 251. Link 291 may be a wireless or wired coupling of server 211 and server 251. For example, link 291 may be an internet connection between server 211 and server 251. In some embodiments, link 295 may couple video game server 211 with one or more of user devices 255-258. Link 295 may be a wireless or wired coupling of server 211 and user devices 255-258. For example, link 291 may connect server 211 and user devices 255-258 through Wi-Fi (e.g., a 802.11 protocol), Bluetooth®, radio frequency systems (e.g., 900 MHz, 1.4 GHz, and 5.6 GHz communication systems), cellular networks (e.g., GSM, AMPS, GPRS, CDMA, EV-DO, EDGE, 3GSM, DECT, IS-136/TDMA, iDen, LTE or any other suitable cellular network or protocol), infrared, TCP/IP (e.g., any of the protocols used in each of the TCP/IP layers), HTTP, BitTorrent, FTP, RTP, RTSP, SSH, Voice over IP (VOIP), any other communications protocol, or any combination thereof.

It is understood that a video game system may be coupled with a communications system through one or more links between a video game server and a communication server (e.g., link 291), one or more links between a video game server and user devices (e.g., link 295), or a combination of both types of links.

While only one communications server, one video game server, and four user devices (e.g., devices 255-258) are shown in FIG. 2, it is understood that any number of servers and user devices can be provided.

Figure 3:
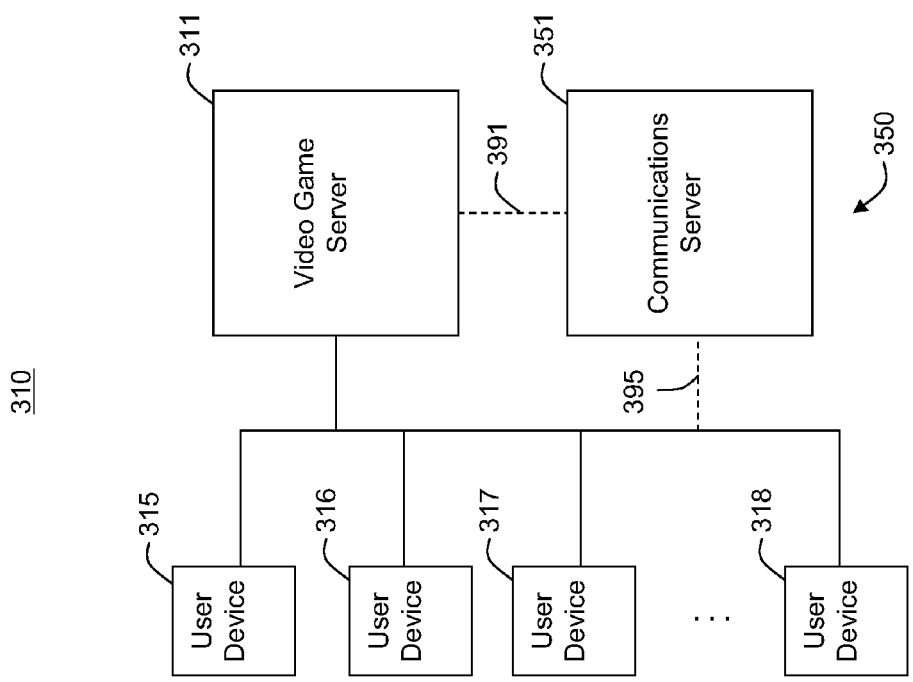
FIG. 3 is a schematic view of an illustrative video game system and an illustrative communications system in accordance with one embodiment of the invention.

In some embodiments, a video game system may include a communications system for facilitating communications between users. For example, a video game system may include communications interfaces, communications applications, communications servers, or any combination thereof. In some embodiments, a communications system may be incorporated into a video game system. FIG. 3 may include communications system 350 incorporated into video game system 310. The embodiment shown in FIG. 3 is substantially similar to the embodiment shown in FIG. 2 with some minor differences.

One difference between the systems shown in the two figures may be that the communications server and the video game server have changed positions in the network architecture. For example, communications server 251 may be the primary server in the embodiment shown in FIG. 2, but video game server 311 may be the primary server in the embodiment shown in FIG. 3. This difference may have an effect on how video games and communications between users are controlled.

Another difference between the systems shown in the two figures may be that the primary function of the user devices can be different in each system. For example, user device 255-258 may be primarily communications device in the embodiments shown in FIG. 2, but user devices 315-318 may be primarily video game devices (e.g., a personal video game console such as an XBOX 360®) in the embodiment shown in FIG. 3. The difference between the two types of user devices may have an effect on the user interfaces that each device includes. For example, a user device that is primarily a communications device may include user interfaces optimized for communications (e.g., a microphone, a camera or an alpha-numeric keyboard) while a user device that is primarily a video game device may include user interfaces optimized for video games (e.g., hand-held video game controller or a joystick). However, in some embodiments, a user device may include interfaces optimized for both communications and video games. For example, a user device may include a first set of interfaces optimized for communications and a separate second set of interfaces optimized for video games.

In some embodiments, a user can configure one or more options to specify which interface(s) she wants to use. For example, a user may specify a single interface or a combination of interfaces that she prefers for communicating with users and/or directly providing video game inputs.

Regardless of how the communications system and the video game system are coupled together or integrated with one another (see, e.g., discussion related to FIGS. 1-3), the communications system may allow users to communicate together in while playing a video game provided by the video game system. For example, the communications system may allow users to form subgroups and/or groups similar to those described in U.S. Pat. No. 8,405,702, which has been incorporated herein by reference.

In some embodiments, each user can have his own addressable user device through which the user communicates. The identity of these devices can be stored in a central system (e.g., a communications hub or server). The central system can further include a directory of all users. This directory may be accessible by or replicated in each user device in the communications network.

The user associated with each address can be displayed via a visual interface on a user device (e.g., an LCD screen). Each user can be represented by his picture, graphic, initials, name, any other suitable identifier, or any combination thereof. If the amount of display space is limited, a device may limit the number of users displayed at one time. For example, the device may include a directory structure for organizing users. In another example, the device may include a search function and accept search queries from the device's user.

Multiple communications media can be supported. Accordingly, a user can choose which communications medium to use when initiating a communication with another user, subgroup or group. In some embodiments, missing communications components (e.g., an audio feed with no complimentary video feed) may be generated and provided, and the user's choice of communications medium may be unlimited by the preferences of other users or the capabilities of their devices. However, a system may still provide a user with the preferences of other users and/or the capabilities of their devices when the user is selecting a communications medium. In some embodiments, a user may choose a combination of communications media when initiating a communication. For example, a user can choose video as the primary medium and text as a secondary medium. In some embodiments, active transcription may be provided in real time and displayed to each user. For example, subtitles may be generated and provided to users participating in video communications.

A more detailed description of suitable communications systems for facilitating user communications can be found in U.S. Pat. No. 8,405,702, which has been incorporated by reference.

In accordance with the present disclosure, video games may be provided to the users of a communications system. For example, a video game system may be coupled with or integrated into a communications system, and the video game system may provide video games to the users of the communications system. In some embodiments, video games may be provided to pairs of users playing one-on-one against each other, more than two users playing against each other and teams of users playing against each other.

In some embodiments, the communications system may monitor the communications between the users to identify video game events. The communications system may generate one or more inputs for the video game system each time a video game event is identified in the communications. For example, if a group of users are playing a game of poker and one user tells another user that he wants to "raise" the bet (e.g., a video game event), the communications system may generate a raise input and provide it to the video game system. This input may be used to control the video game even if none of the users provided an input directly to the video game system (e.g., no users pressed a "raise" button, selected a "raise" option using a mouse or spoke a "raise" command directly to the system).

In some embodiments, a communications system and a video game system may be integrated together, and one or more user interfaces may be shared by the two systems (see, e.g., FIG. 2 and FIG. 3). In some embodiments, a user may operate a single device to access both systems.

In some embodiments, the video game system may employ one or more user interfaces of the communications system. The video game system may employ output user interfaces (e.g., display screens, speakers, headsets, or tactile feedback mechanisms) of the communications system. For example, each device in the communications system may include a display screen for displaying communications to a user, and the video game system may use the same display screen for displaying information about a video game to the user. The video game system may employ input user interfaces (e.g., video cameras, webcams, microphones, keyboards, computer mice, hand-held controllers, or joysticks) of the communications system. For example, each device in the communications system may include a keyboard for receiving inputs from a user, and the video game system may use the same keyboard to receive inputs from the user.

In some embodiments, one or more user interfaces of the communications system may be simultaneously shared by the communications system and the video game system. For example, video chat may be displayed on the same screen as a game display. In another example, audio from a video chat may be provided on the same output as audio from a video game. When sharing a user interface, the two systems may each provide outputs in a manner that does not interfere with the other system. For example, a video chat window may be displayed within a video game window in a manner that does not interfere with the presentation of video game graphics. Alternatively, data associated with a video game may be displayed within a communications window in a manner that does not interfere with the presentation of communications.

In some embodiments, a communications systems may automatically move its output (e.g., a video chat window) to avoid interfering with the output of a video game system. For example, a video game graphic may change (e.g., the focus of the graphic may shift to a different part of the screen) and, in response to the change, the communications system may resize or move one or more communications outputs (e.g., video chat windows). In the example of a poker video game, the communications outputs (e.g., video chat windows) associated with users not actively playing the game (e.g., players that have folded their hands) may be reduced in size and the communications outputs associated with active users may be enlarged to focus attention on them. This may be advantageous because a user may not be required to manually resize or move windows as video game graphics change, and such functionality is difficult, if not impossible, to achieve when a communications system and a video game system operate alongside each other without cooperating (e.g., independent applications running in parallel on a computer). In another example involving a poker video game, the communications output (e.g., video chat window) associated with an active user (e.g., the user whose turn it is) may be repositioned or resized to indicate that it is currently that user's turn.

In some embodiments, users that are not playing in a video game may be able to watch one or more of the provided video games. For example, a user not playing in a video game may still be able to observe the video game as it progresses. In some embodiments, users that are not playing in the video games may be able to affiliate with one of the players or teams playing in a video game. For example, a user not playing in a video game may be able to become a fan of a player or a team and observe the video game from the point of view of that player or team.

In some embodiments, a video game system may display different video game information to different users. For example, a video game system may display private video game information (e.g., a player's cards) to only that player or that player's team while displaying public information (e.g., community cards) to all users. In some embodiments, a video game system may also display public information from a perspective based on a user's virtual location to create the impression of gameplay in a three-dimensional space. In some embodiments, a user's virtual location may have meaning in a game (e.g., the relative order of gameplay is based on the position of each player) so displaying public information from that perspective may be advantageous. The disclosure of video game information can be based on a user's involvement in the video game. For example, a user may receive different video game information depending on whether the user is a player, a member of a particular team, an observer, an affiliate, or any combination thereof. For example, an affiliate may receive all of the information that the corresponding player receives so that the affiliate can observe the player's activity.

In some embodiments, a communications system may limit the ability of users to communicate amongst each other. When a user is involved in a video game, a communications system may limit the user's ability to communicate based on the user's involvement. For example, a communications system may prevent players from receiving communications from users watching the video game or affiliates associated with the players. In another example, a communications system may allow teams of users to conduct private discussions before taking a collective action (e.g., before giving a collective answer in a team quiz game). Limiting the ability of users to communicate amongst each other can be advantageous in multiple scenarios. For example, limiting the ability of users to communicate can prevent users who have access to secret information from cheating by informing other users. In another example, limiting the ability of users to communicate can prevent unnecessary communications from disrupting the flow of the game. In some embodiments, a communications system may limit communications based on the rules of the game being played (e.g., poker players cannot communicate secretly amongst each other but team members in a quiz game can communicate in secret). In some embodiments, a communications system may only limit communications of certain media. For example, a system may prevent users from communicating via a disruptive medium (e.g., audio) while still allowing nondisruptive media (e.g., text or silent video).

In some embodiments, a communications system may monitor activity on a user device to determine if a user is attempting to cheat by communicating with other users. For example, a communications system may monitor activity on a user device to determine if the corresponding user is attempting to communicate with other users through a different program. In some embodiments, a communications system may monitor the keyboard inputs and/or microphone inputs of a user device to determine if the corresponding user is attempting to communicate with other users. In some embodiments, a communications system may monitor the active applications of a user device to determine if the corresponding user is attempting to communicate with other users. For example, a communications system may monitor the active applications of a user device to determine if the user device is running any other communication applications (e.g., video chat or instant messaging applications) that would allow the user to communicate with other users.

In some embodiments, a communications system may automatically modify the rosters of groups or subroups based on the progress of a video game. When a video game system determines that it is appropriate to modify the roster of a group or subgroup, the video game system may send a command to the communications system. For example, in a poker tournament where each group represents a table, a video game system can send a command to a communications system instructing the communications system to add a player to a particular group (e.g., if that player moved over from another group) or remove player from a particular group (e.g., if that player is eliminated or moved to another group). In some embodiments, when a player is added to a group or subgroup, a communications system may also add any affiliates associated with the player to the same group or subgroup.

In some embodiments, a communications system may provide entertainment to users not playing (e.g., observers) by providing communications from players. For example, a communications system may provide observers with a video and audio feed showing how players respond to challenges in the video game. Such a communications system may serve as a platform for observers to view a video game along with how one or more players respond to the challenges of the game. In some embodiments, a user watching a game may be able to select one or more users to monitor during the video game. For example, a user may be able to monitor her friends' reactions during a game. In some embodiments, a communications system may automatically provide an observer with communications from the most important players in the video game. For example, a communications system may automatically provide an observer with video and audio feeds from players with the highest scores or players that recently accomplished an important task (e.g., defeated an opponent or captured a flag). This content may be entertaining to users watching the game and may provide a new category of content created by individual players or teams of players.

In some embodiments, the combination of a communications system and a video game system may allow active moderation of a video game. For example, a host, moderator, judge, or any combination thereof may be able to moderate a video game through a communications system.

In some embodiments, a video game system can change the nature of gameplay by incorporating simultaneous communications from a communications system. For example, video communications from a user may allow other users to observe the user's gestures and facial expressions and such observations may impact gameplay. This observation may be particularly desirable in any game where nonverbal communications or guessing a player's intent or strategy is important. In some embodiments, observation may be desirable in games where bidding, bluffing, or nuanced expression (e.g., gesturing) may be important. For example, such observation may have a profound effect on a video game based on poker, bridge, charades, or even password.

In some embodiments, communications amongst users playing a video game (e.g., players) may be monitored to generate video game inputs based on the communications. For example, communications amongst players may be monitored to determine if the players' actions represent video game events. If a video game event is identified, a video game input may be generated and the video game may progress accordingly. Any suitable communications medium or combination of communications media may be monitored to determine if a video game event has occurred. For example, audio communications, video communications, or a combination of audio and video communications may be monitored to determine when to generate a video game input.

In some embodiments, communications may be monitored at a user device level. For example, a user device (e.g., a computer or other electronic device) may monitor communications from its user to determine when a video game event occurs. If a video game event is identified, the user device may transmit a video game input to one or more of the other components of the video game system. For example, the user device may transmit a video game input to other user devices or a video game server in response to identifying a video game event. In some embodiments, the user device may transmit a duplicate of the communication to one or more of the other components of the video game system in response to identifying a video game event. For example, the user device may transmit a duplicate of the communication to a video game server so that the server can determine the significance of the video game event and generate a video game input.

In some embodiments, communications may be monitored at a server level. For example, a server may receive communications from one or more user devices and monitor them to determine when a video game event occurs.

In some embodiments, a communications server can monitor communications to determine when a video game event occurs. For example, a communications server may already be processing communications to transmit them to their recipients and, while performing the processing, the server may monitor the communications to determine when a video game event occurs. If a video game event is identified, the communications server may transmit a video game input to one or more components of the video game system. For example, the communications server may transmit a video game input to a video game server or one or more user devices in response to identifying a video game event.

In some embodiments, a video game server can monitor communications to determine when a video game event occurs. To facilitate communication monitoring by a video game server, communications may be duplicated (e.g., by the originating user device or a communications server), and then the duplicate may be sent to the video game server. For example, an audio and/or video feed that would traditionally be transmitted to a communications server or directly to the recipients of a communication may be duplicated and sent to a video game server for monitoring. Such a duplication step may prevent an analysis of communications at the monitoring step from slowing down the delivery of the original communications. The video game server may monitor the duplicate communications to determine when a video game event occurs and, in response to identifying an event, the server may act on the event itself or transmit a video game input to one or more other components of the video game system. For example, the video game server may transmit a video game input to one or more user devices in response to identifying a video game event.

In some embodiments, audio processing can be used when monitoring communications to determine if a video game event has occurred. For example, audio communications or audio components of video communications can be analyzed using audio processing to determine if a video game event has occurred. When monitoring communications, audio processing can be used to identify the words spoken by users, the context in which the words are spoken, the intonation used in speaking the words, who the users are talking to when the words are spoken or any other suitable audio features.

In some embodiments, automatic speech recognition can be used when monitoring communications to determine if a video game event has occurred. Audio communications or an audio component of video communications may be monitored using automatic speech recognition. For example, a system may monitor a user's speech to determine when the user says a word associated with a video game event (e.g., the user says "raise"). To identify which user's speech created a video game event, the communication's origin (e.g., the hardware address of the corresponding user device) can be detected or speech recognition techniques may be used to identify the user based on his or her voice.

In some embodiments, syntax analysis can be used when monitoring communications to determine if a video game event has occurred. A system can analyze the context in which a term is used to when determining if a video game event has occurred. For example, to determine if a particular term represents a video game event, a system can analyze whether or not that term is used in a question or in the past tense, either of which may indicate that the term does not represent a video game event.

In some embodiments, intonation analysis can be used when monitoring communications to determine if a video game event has occurred. A system can analyze the tone with which a term is spoken when determining if a video game event has occurred. For example, to determine if a particular term represents a video game event, a system can analyze whether or not that term is spoken with an assertive tone.

In some embodiments, spatial analysis can be used when monitoring communications to determine if a video game event has occurred. A system can perform audio processing that, based on the layout of a speaking user's display, can identify which other user the speaking user is speaking to. For example, if another user is located on the right side of the display and a speaking user is speaking to his or her right, the system can identify that the speaking user is speaking to that other user. In some embodiments, a user device may include multiple microphones to identify the direction in which a user is speaking.

In some embodiments, other audio processing techniques can be used when monitoring communications to determine if a video game event has occurred. For example, an audio processing technique that can identify clicks or other non-speech noises can be used to monitor communications and identify video game events.

In accordance with the disclosure, one or more suitable forms of analysis can be used when monitoring communications to determine if a video game event has occurred. For example, a system can perform speech recognition, syntax analysis, intonation analysis, any other suitable form of analysis or any combination thereof. When multiple forms of analysis are applied, the results of the different analysis can be combined using any suitable technique to determine if a video game event has occurred. For example, the results of each analysis can be combined using a weighted average technique.

In some embodiments, a system monitoring communications (e.g., a communications system or a video game system) may include specialized hardware for monitoring communications. For example, a system may include an ASIC or FPGA for performing audio processing algorithms on communications between users.

It is understood that overly broad criteria for video game events may unintentionally trigger inputs when the users do not want to progress the video game. Accordingly, criteria for video game events may be set with a level of specificity to ensure that users do not accidentally initiate video game inputs.

In some embodiments, video processing can be used when monitoring communications to determine if a video game event has occurred. For example, video communications can be analyzed using video processing to determine if a video game event has occurred. When monitoring communications, video processing can be used to identify a user's position, bodily movements, facial movements, eye movements or any other suitable visual feature.

In some embodiments, communications may be monitored using machine vision pattern recognition to determine when to generate a video game input. Video communications (e.g., from a video camera or webcam) may be monitored to determine when a user performs a motion that corresponds to a video game event. For example, a user's video communications may be monitored to determine when the user performs a motion representing a video game event (e.g., the user waves his hand in a pattern indicating that he folds his hand). In some embodiments, a user may wear special indicators when performing a motion representing a video game event. For example, a user may wear distinctive (e.g., brightly colored or reflective) markers on one or more joints when performing a motion so that the machine vision pattern recognition is able to reliably detect the user's movement.

In some embodiments, a user may stand in front of a special background when performing a motion representing a video game event. For example, a user may stand in front of a static background (e.g., a blue screen or other flat background) when performing a motion so that the video processing is able to reliably detect the user's bodily movement.

In some embodiments, other video processing techniques can be used when monitoring communications to determine if a video game event has occurred. For example, a video processing technique that can identify light sources or other non-movement visual activity can be used when monitoring communications.

In some embodiments, a system monitoring communications (e.g., a communications system or a video game system) may include specialized hardware for video processing. For example, a system may include an ASIC or FPGA for performing video processing algorithms on communications between users.

Video processing may be used to monitor users' motions in one, two or three dimensions. Users' motions may be monitored in one or two dimensions by monitoring video communications amongst users. Users' motions may be monitored in three dimensions by monitoring video communications amongst users and determining changes in size which indicate that motion is occurring towards or away from the viewpoint (e.g., a video camera or webcam). For example, a motion pointing towards the viewpoint may cause one or more parts of a user to appear larger and a motion pointing away from the viewpoint may cause one or more parts of a user to appear smaller.

In some embodiments, a system (e.g., a communications system or a video game system) may include one or more additional input interfaces to monitor users' motions in three dimensions. For example, a system may include a range finder for monitoring user's motions in three dimensions. Such a range finder may, for example, be included with a video camera or webcam, and data from the range finder may be associated with the video. When monitoring the user's movements, processing the video may provide two dimensions of movement and data from the range finder may be used to determine the third dimension. In another example, a system may include a pressure sensitive pad for a user to stand or sit on when playing, and data from the pressure sensitive pad may be used to provide a third dimension of motion. For example, a pressure sensitive pad may provide data corresponding to the user's distance and/or position relative to the viewpoint. In some embodiments, two or more input interfaces can be used in combination to monitor users' motions in three dimensions. In some embodiments, two or more input interfaces can be used in combination to confirm users' motions so that calculations of movement in three-dimensional space can be more precise.

In some embodiments, communications may be monitored using a combination of techniques. For example, both auto processing (e.g., automatic speech recognition) and video processing (e.g., machine vision pattern recognition) may be used in combination to determine when to generate a video game input. In some embodiments, a system may generate a video game input if either monitoring technique indicates that a video game event has occurred. In some embodiments, a system may generate a video game input only if both monitoring techniques indicate that a video game event has occurred (e.g., a user said "raise" and moved his hand to indicate a raise).

In some embodiments, one or more predetermined signal words may be used to trigger a complex event interpretation process. For example, a signal word such as "game" may be used to trigger a complex audio and/or video processing function for determining if a video game event has occurred. In some embodiments, a system may only conduct video processing if the system has identified a signal word in the audio of a communication through audio processing. Such a feature may be advantageous because it may limit the processing demands on a system monitoring communications amongst users.

In some embodiments, a server may control the ability of user devices to generate video game inputs based on gameplay. For example, a video game server may communicate with the user devices so that only active users (e.g., users whose turn it is) may provide a video game event. It is understood that any functionality limiting the ability of a user to provide a video game event may be based on the rules of the video game being played but, in general, it may be desirable to prevent users from inappropriately providing a video game event out of turn. In some embodiments, preventing out-of-turn inputs may reduce unnecessary traffic to the server and unnecessary processing performed by the server or user devices.

In some embodiments, a communications system or a video game system may request confirmation from a user before generating a video game input. If a system determines that a video game event has occurred (e.g., a user said "raise" and/or moved his hand to indicate a raise), the system may ask the user to confirm the event before generating a video game input. In some embodiments, the user may confirm the event using a communication over the same media that first indicated the event. For example, the user may confirm the event by saying "yes" or by nodding in agreement. In some embodiments, the user may confirm the event using another user interface (e.g., a keyboard, computer mouse, hand-held controller, or joystick). For example, the system may display a summary of the detected event to the user, and the user may review the summary and then confirm the event by selecting a confirm option.

In some embodiments, one or more predetermined signal words may be used to trigger a complex event confirmation process. For example, a signal word such as "confirm" may be used to trigger an extra confirmation step before a video game input is generated. Such a feature may be advantageous because it may allow for confirmation in important situations but still limit how often users are asked to provide confirmation. In some embodiments, a video game may include a confirmation option whereby a user can select how often he wants to be asked for confirmation (e.g., by selecting a point on a continuum from hardly ever to nearly all the time).

A communications system may generate video game inputs based on communications between users for any suitable type of video game. Moreover, a communications system may generate inputs for one-on-one, individual free-for-all or team-based video games.

In some embodiments, inputs for quiz video games may be generated based on communications in accordance with the disclosure. An exemplary quiz video game for individuals may be Jeopardy!. In this example, all of the users playing or watching the game may be presented with prompts (e.g., answers in the case of Jeopardy!). The system may limit the players' ability to receive communications from users that are not playing the game, while allowing the user's watching the game to freely communicate amongst each other. When a player communicates a proposed answer to the prompt, all users playing and watching the video game may receive the player's communication and the system may generate a video game input based on the communication. In this manner, the video game can automatically progress in response to the player's communication. Another exemplary quiz game for individuals may be Name That Tune. In this example, all of the users playing or watching may be presented with prompts, but the prompt may be paused as soon as a player provides a communication indicating that he wants to submit an answer (e.g., hitting a buzzer or saying a trigger term or phrase such as "got it"). The player may provide a communication to all other users saying her answer, and the system may use automatic speech recognition to analyze the communication. The player may be awarded points if the server determines that the answer is correct, but the prompt may resume if the server determines that the answer is incorrect. In some embodiments, a similar type of quiz video game can be provided so that all players can provide answers at the same time until a correct answer is given.

Quiz video games may be provided in a team format. An exemplary quiz video game for teams may be Charades. In this example, all of the users playing or watching the game may receive communications from the performing players (e.g., those users silently trying to elicit a response). The system may provide the answer (e.g., the response the performing players are trying to elicit) to players on the opposite team and users watching the game while players on the active team try to guess the scene. In some embodiments, the system may make the communications from the performing players more prominent (e.g., enlarge and/or reposition video feeds from the players) to draw the other users' attention to those players. The system may monitor communications from each player on the active team and generate video game inputs based on the communications. For example, the system may generate a video game input with a potential answer every time a player on the active team speaks a new answer. Another exemplary quiz video game for teams may be Family Feud. In this example, all of the users playing or watching the game may be presented with prompts. The system may then allow the players on the active team to privately discuss the prompt before providing an answer. If appropriate for the game, time limits may be applied to any private discussions amongst teammates.

In some embodiments, inputs for card video games may be generated based on communications in accordance with the disclosure. An exemplary card video game for individuals may be poker. In some embodiments, all of the users playing and watching may receive information about community cards (e.g., those cards lying face up on the table) while private cards may be visible to only the corresponding player. In some embodiments, non-playing users affiliated with a player may receive information about that player's cards so that the affiliated users can follow the game. The system may facilitate communications amongst all players so that, for example, the players can employ tactics such as bluffing through the communications. The system may monitor the communications between the players, and may generate a video game input when a video game event is identified. In some embodiments, the communications system may limit the ability of players to receive communications from other users with access to additional information so that, for example, players do not attempt to cheat by communicating with other users that can tip-off the players. An exemplary card video game for teams may be spades. In this example, the system may function in a similar manner as the previously discussed example of a poker video game. However, the communications system may allow team members to communicate privately if that is allowed by the rules of the card game being played. In embodiments where players are allowed to communicate privately with other players or non-playing users, any private communications may be represented graphically to the other players, even if the content of the communications are not public, or the private communications may be hidden from the other players.

Figure 4:
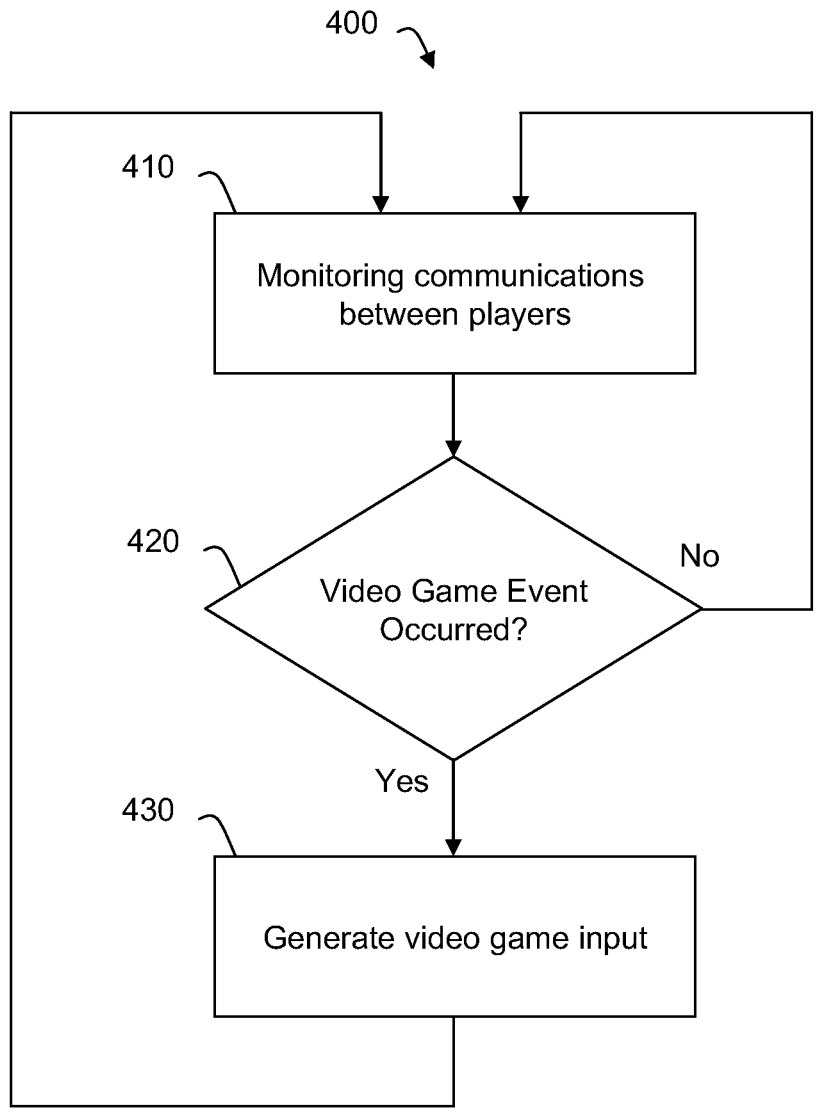
FIG. 4 is a flowchart of an illustrative process for facilitating video games amongst multiple users in accordance with one embodiment of the invention.

FIG. 4 includes process 400 for generating video game inputs in accordance with one embodiment of the invention. Process 400 can be performed as part of any video game in which players may want to communicate amongst each other. Process 400 can be performed by a communications system and a video game system coupled together or integrated into a single system (see, e.g., FIGS. 1-3). At block 410, communications between players can be monitored. For example, a communications system or a video game system can monitor communications between two or more users playing a video game. The monitored communications can include any type of media, such as text, audio, video, or any combination thereof. At block 420, a system determines if a video game event has occurred. For example, a system monitoring communications can perform one or more algorithms (e.g., audio and/or video processing) on communications between players to determine if a video game event has occurred. If a video game event has not occurred, process 400 can continue by returning to block 410 and monitoring communications between players. If a video game event has occurred, process 400 can continue with block 430. At block 430, a video game input can be generated. The video game input can be generated by the system monitoring communications if it determines that a video game event occurred. In some embodiments, the video game input generated at block 430 can be based on the video game event that occurred. For example, if the video game is a poker game and the video game event is based on the player in seat 7 saying "fold," the video game input may specify that the player in seat 7 has folded his hand. This video game input can then be used by the video game system to advance the video game being played. After a video game input has been generated, process 400 can continue by returning to block 410 and monitoring communications between players.

Figure 5:
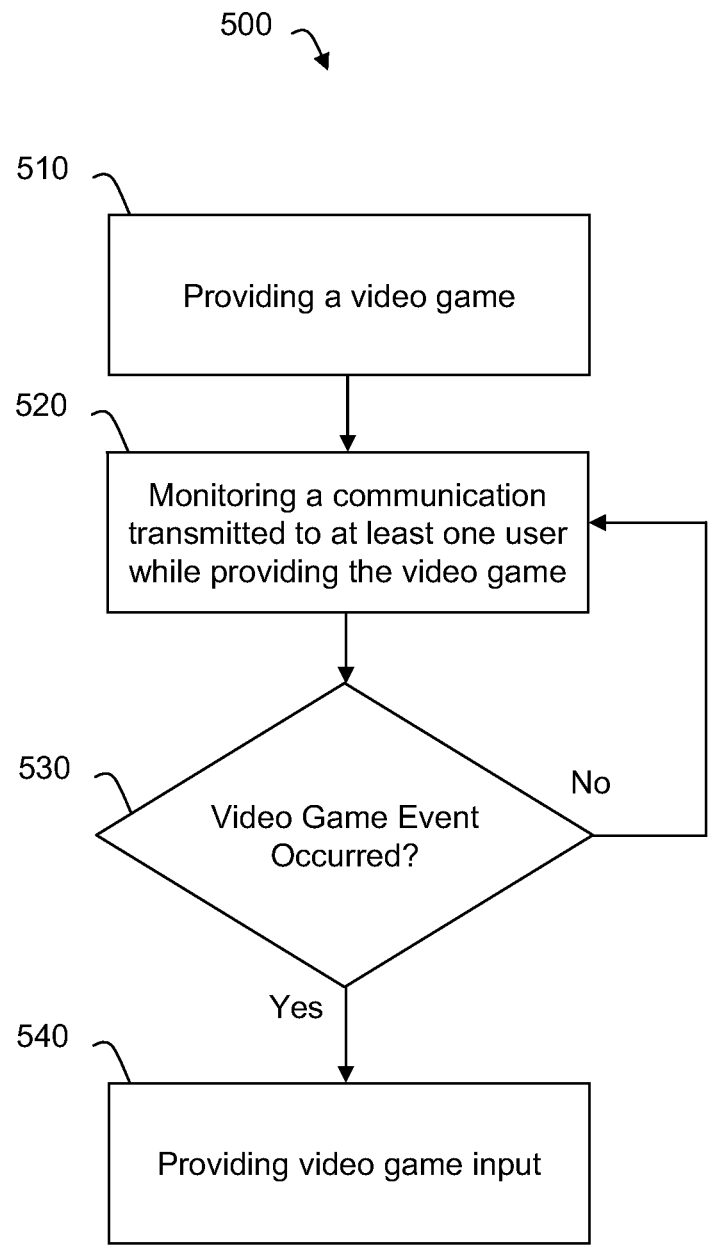
FIG. 5 is a flowchart of an illustrative process for facilitating video games amongst multiple users in accordance with one embodiment of the invention.

FIG. 5 includes process 500 for generating video game inputs in accordance with one embodiment of the invention. Process 500 can be performed as part of any video game in which players may want to communicate amongst each other.

Process 500 can be performed by a communications system and a video game system coupled together or integrated into a single system (see, e.g., FIGS. 1-3). At block 510, a video game can be provided. For example, a system can provide a video game to multiple users. In accordance with the disclosure, any suitable type of video game can be provided at block 510 and, in some embodiments, the video game provided at block 510 can include a turn-based video game. At block 520, a communication that is transmitted to at least one user is monitored. The communication can be monitored while the video game is provided. For example, a communications system and/or a video game system can monitor communications between two or more users while the communications system and/or the video game system is providing a video game to the users. The monitored communications can include any type of media, such as text, audio, video, or any combination thereof. At block 530, a system determines if a video game event has occurred. For example, a system monitoring a communication can analyze a communication between users playing a video game to determine if a video game event has occurred. In some embodiments, a system monitoring a communication can analyze audio and/or video in the communication to determine if a video game event has occurred. In some embodiments, determining if a video game event has occurred can include monitoring a communication to determine if a user has spoken a particular term to at least one other user. In some embodiments, determining if a video game event has occurred can include monitoring a communication to determine if a user has spoken a particular term during conversation with at least one other user. In some embodiments, determining if a video game event has occurred can include monitoring a communication to determine if a user has moved in a particular manner.

If a video game event has not occurred, process 500 can continue by returning to block 520 and monitoring a communication transmitted to at least one user while providing the video game. If a video game event has occurred, process 500 can continue with block 540. At block 540, a video game input can be provided. The video game input can be provided by the system monitoring communications if it determines that a video game event occurred. In some embodiments, the video game input provided at block 540 can be based on the video game event that occurred. For example, if the video game is a poker game and the video game event is based on the player in seat 7 saying "fold," the video game input may specify that the player in seat 7 has folded his hand. This video game input can then be used by the video game system to advance the video game being played. After a video game input has been generated, process 500 can continue by returning to block 510 and providing the video game.

In some embodiments, process 500 may include transmitting the monitored communication to the at least one user. For example, the monitored communication can be transmitted to at least one user after block 520. In some embodiments, the monitored communication can be transmitted to at least one user regardless of whether or not a video game event has occurred. For example, the monitored communication can be transmitted to at least one user after block 520 but before block 530.

In some embodiments, process 500 may include identifying an active user for the video game and the monitoring performed at block 520 may include monitoring only communications received from the active user. For example, if gameplay is waiting on an active user to do something, a system may only monitor communications received from the active user to determine when a video game event occurs. In some embodiments, the video game may be based on turns and each of the turns may be associated with a user so that the active user is the user associated with a current turn. For example, in a poker game, each turn may be associated with a user as the gameplay progresses around the table. In such embodiments, a system may monitor communications received from users according to the context of the gameplay. Such embodiments may be advantageous because they can decrease the audio and/or video processing requirements by only monitoring an active user, as opposed to all users playing the video game.

Figure 6:
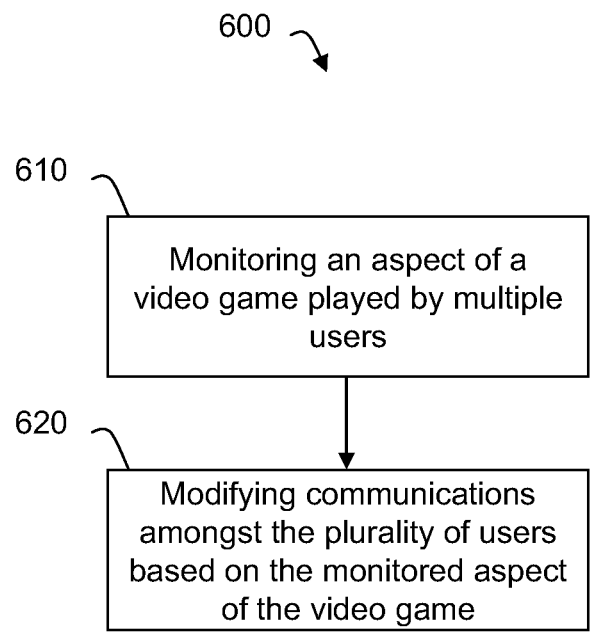
FIG. 6 is a flowchart of an illustrative process for providing communications based on video games in accordance with one embodiment of the invention.

In some embodiments, a communications system may modify communications amongst users based on an aspect of a provided video game. For example, a communications system may modify communications received from the video game's active user or users to increase their prominence. FIG. 6 includes process 600 for providing communications based on video games in accordance with one embodiment of the invention. Process 600 can be performed as part of any video game in which players may want to communicate amongst each other. Process 600 can be performed by a communications system and a video game system coupled together or integrated into a single system (see, e.g., FIGS. 1-3).

At block 610, an aspect of a video game played by multiple users can be monitored. For example, monitoring an aspect of a video game may include identifying an active user of the video game. In some embodiments, the video game may be based on turns and each of the turns may be associated with a user so that the active user is the user associated with a current turn. In such embodiments, monitoring an aspect of the video game may simply including tracking the active user of the video game.

At block 620, communications amongst the plurality of users can be modified based on the monitored aspect of the video game. For example, if the monitored aspect is the active user of the video game, the communications from the active user can be modified at block 620 to increase the prominence of the communications. The audio and/or visual components of a communication can be modified at block 620. The audio components of a communication can be modified at block 620 by adjusting the volume of the audio or effects imposed on the audio. For example, the volume of a communication can be increased to increase its prominence. In another example, the audio component of a communication can be redistributed between different speakers (e.g., left and right channel) to represent a position. The video components of a communication can be modified at block 620 by adjusting the size of video in the communications, the position of video in the communications, or the effects imposed on video in the communications. For example the size and/or position of the video component of a communication can be adjusted to increase its prominence. In some embodiments, a user portrayed in a communication (e.g., the user sending the communication) can be disguised at block 620. For example, if the video game requires that the identity of a user be confidential, the user can be disguised by displaying the user in blurred video, as a silhouette, or as a graphical avatar.

Figure 7:
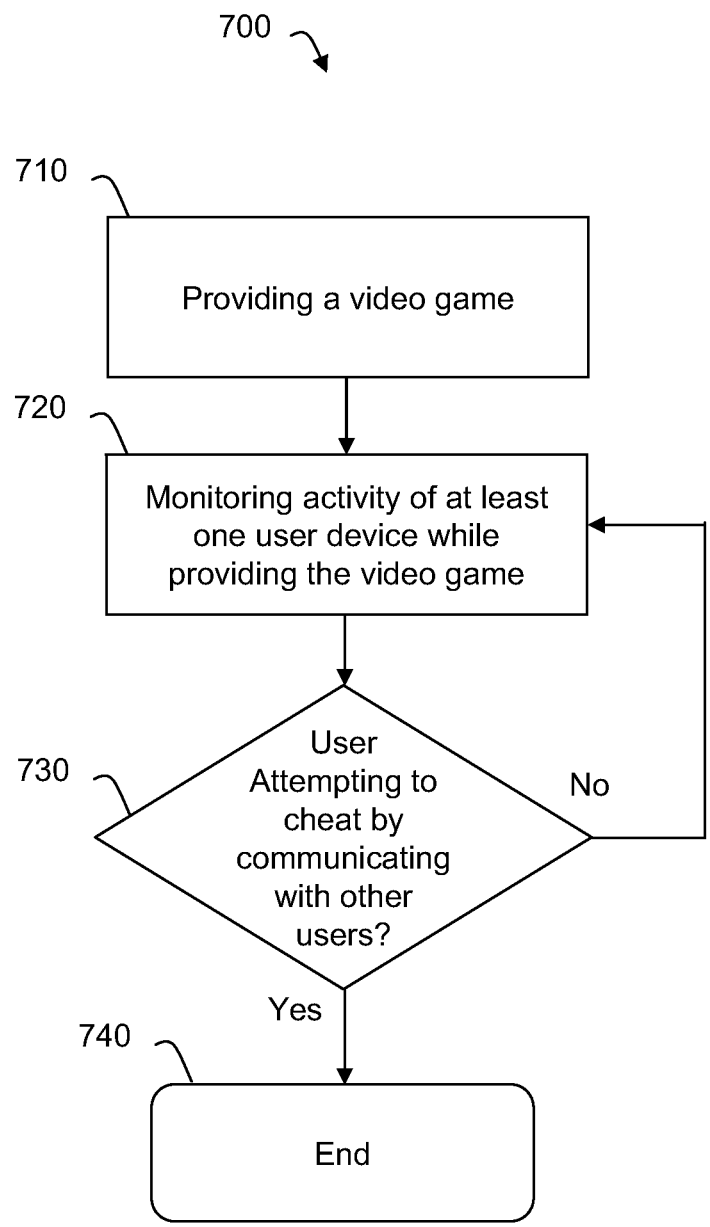
FIG. 7 is a flowchart of an illustrative process for facilitating video games amongst multiple users in accordance with one embodiment of the invention.

In some embodiments, a system may monitor a user's activity to determine if the user is attempting to cheat by communicating with other users during a video game. For example, a system may monitor the user's input devices or other applications running on the user's device to determine if the user is attempting to cheat. FIG. 7 includes process 700 for facilitating video games amongst multiple users in accordance with one embodiment of the invention. Process 700 can be performed as part of any video game in which players may want to communicate amongst each other. Process 700 can be performed by a communications system and a video game system coupled together or integrated into a single system (see, e.g., FIGS. 1-3).

At block 710, a video game can be provided. For example, a system can provide a video game to multiple users. In accordance with the disclosure, any suitable type of video game can be provided at block 710 and, in some embodiments, the video game provided at block 710 can include a turn-based video game.

At block 720, the activity of at least one user device can be monitored. The activity can be monitored while the video game is provided. For example, a communications system and/or a video game system can monitor the activity of at least one user device while the communications system and/or the video game system is providing a video game to the corresponding user. Any type of activity can be monitored at block 720. For example, monitoring the activity of at least one user device can include monitoring the device's inputs (e.g., keyboard and/or microphone). In another example, monitoring the activity of at least one user device can include monitoring the active applications running on the device.

At block 730, a system determines if a user is attempting to cheat by communicating with other users. For example, a system monitoring the activity of at least one user device can determine if the corresponding user is attempting to use the device to communicate with other users. For example, the system can monitor inputs to the device (e.g., keyboard and/or microphone inputs) to determine if the corresponding user is communicating with other users outside of the regulated communication groups and subgroups. In another example, the system can monitor the active applications running on the device to determine if the corresponding user is operating an application (e.g., an instant messaging application or a standalone video chat application) to communicate with other users outside of the regulated communication groups and subgroups. This functionality can be advantageous because it can prevent users from bypassing any communication restrictions implemented by the system. In some embodiments, monitoring the device's microphone input can even detect when a user attempts to use a separate communication system (e.g., a land-based or cellular telephone) to orally communicate with other users.

If the system determines that the user is not attempting to cheat by communicating with other users, process 700 can continue by returning to block 720 and monitoring the activity of the at least one use device while providing the video game. On the other hand, if the system determines that the user is attempting to cheat by communicating with other users, the system can take any suitable action in response. In the embodiment shown in FIG. 7, process 700 ends at block 740 after determining that a user is attempting to cheat. However, any suitable steps can be taken in response to determining that a user is attempting to cheat by communicating with other users. For example, the system can record the identity of any user attempting to cheat for later action. In another example, the system can block any user that is attempting to cheat from the video game and/or the ability to communicate.

While described as separate processes, it is understood that processes 400, 500, 600 and 700 can be performed simultaneously in some embodiments. For example, a communications system and a video game system coupled together or integrated into a single system can simultaneously monitor communications to determine when video game events occur, monitor one or more aspects of a video game to provide communications based on the game and monitor the activity of at least one user device to determine if a user is attempting to cheat.

In some embodiments, a recording of communications and the accompanying video game may be automatically saved after a video game is complete. Such a recording may include communications between users (e.g., communications between all users or only communications between players) along with video game events representing the progression of the video game. The recording may also include video game output (e.g., gameplay video) showing the video that was generated when the game was played. The recording may be in any suitable format for reviewing the communications and the video game. For example, the recording may have the format of the original media used during the video game. In another example, the original media may be converted to text and the recording may be a transcript of the communications and video game. In some embodiments, a communications system may include tools for a user to publish recorded content. In some embodiments, a communications system may include a software tool for a user to combine previous gameplay video with contemporaneous communications from one or more users to publish sequences. A user may be able to customize, for example, which players communications are displayed, the media in which the communications are displayed, the area of the screen in which the communications are displayed, the content of the gameplay video, the perspective angle of the gameplay video, background music, or any suitable combination thereof.

It is understood that the previous discussion about generating video game inputs based on communications between users can also be applied to presentation systems and methods. For example, a communications system can be used to facilitate presentations generated by a presenting user (e.g., a presenter) and provided to other users (e.g., audience members). In some embodiments, the presentation can include a slideshow (e.g., a PowerPoint® slideshow) that is provided to the audience members over a video feed along with an audio and/or video feed from the presenter. The communications from the presenter can be monitored to determine when presentation events occur (e.g., the presenter says "next slide" or "play embedded movie") and, in response, a presentation input can be generated. For example, when a presenter says "next slide" the communications system or the presentation system may generate a presentation input that causes the presentation to advance to the next slide. In some embodiments, the presentation can include a video (e.g., a movie file or a DVD) that is provided to the audience members over a video feed along with an audio and/or video feed from the presenter. The communications from the presenter can be monitored to determine when presentation events occur (e.g., the presenter says "next scene" or "pause") and, in response, a presentation input can be generated. In some embodiments, the communications system can limit the communication abilities of user based on their role in the presentation. For example, the communications system may prevent audience members from broadcasting communications to all of the other audience members during the presentation unless the presenter gives them permission (e.g., to ask the presenter a question about the presentation).

The various embodiments of the invention may be implemented by software, but can also be implemented in hardware or a combination of hardware and software. The invention can also be embodied as computer readable code on a computer readable medium. The computer readable medium can be any data storage device that can store data which can thereafter be read by a computer system. Examples of a computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The above described embodiments of the invention are presented for purposes of illustration and not of limitation. It is understood that one or more features of an embodiment can be combined with one or more features of another embodiment to provide systems and/or methods without deviating from the spirit and scope of the invention.

What is claimed is:

1. A method for facilitating video games amongst multiple users, the method comprising:
   providing a video game;
   monitoring a communication directed from one user to at least another user while simultaneously providing the video game, the communication comprising at least one of a non-video game event and a video game event;
   determining if the non-video game event has occurred within the monitored communication;
   determining if the video game event has occurred within the monitored communication; and
   providing a video game input in response to determining that the video game event has occurred.

2. The method of claim 1, further comprising:
   identifying an active user for the video game, wherein the monitoring comprises monitoring only communications received from the active user.

3. The method of claim 2, wherein:
   the video game is based on turns;
   each of the turns is associated with a user; and
   the active user is the user associated with a current turn.

4. The method of claim 1, further comprising:
   transmitting the monitored communication to the at least one user.

5. The method of claim 1, wherein determining if a video game event has occurred comprises:
   analyzing audio within the monitored communication.

6. The method of claim 1, wherein determining if a video game event has occurred comprises:
   determining if a user has spoken a particular term to the at least one other user.

7. The method of claim 1, wherein determining if a video game event has occurred comprises:
   determining if a user has spoken a particular term during conversation with the at least one other user.

8. The method of claim 1, wherein determining if a video game event has occurred comprises:
   determining if a user has spoken a particular phrase to the at least one other user.

9. The method of claim 1, wherein determining if a video game event has occurred comprises:
   analyzing video within the monitored communication.

10. The method of claim 1, wherein determining if a video game event has occurred comprises:
    determining if a user has moved in a particular manner.

11. A system for facilitating video games amongst multiple users, the system comprising:
    a first user device operative to receive communications from a first user;
    a second user device operative to provide communications to a second user; and
    a server in communication with the first user device and the second user device and operative to:
       provide a video game to the first user and the second user;
       route communications from the first user to the second user while simultaneously providing the video game, the communications comprising at least one of non-video game events and video game events;
       identify the non-video game events within the communications;
       identify the video game events within the communications; and
       provide video game inputs based on the identified video game events.

12. The system of claim 11, wherein the server is further operative to identify video game events within the communications by analyzing audio within the communications.

13. The system of claim 11, wherein the server is further operative to identify video game events within the communications by analyzing video within the communications.

14. A method for providing communications based on video games, the method comprising:
    monitoring an aspect of a video game played by a plurality of users;
    monitoring communications between the plurality of users while simultaneously providing the video game to the plurality of users, the communications comprising at least one of a non-video game event and a video game event;
    determining if the non-video game event has occurred within the monitored communications;
    determining if the video game event has occurred within the monitored communications;
    providing a video game input in response to determining that the video game event has occurred; and
    modifying a characteristic of the communications between the plurality of users based on the monitored aspect of the video game.

15. The method of claim 14, wherein monitoring an aspect comprises identifying an active user for the video game.

16. The method of claim 15, wherein:
    the video game is based on turns;
    each of the turns is associated with a user; and
    the active user is the user associated with a current turn.

17. The method of claim 15, wherein modifying comprises increasing the prominence of the communications from the active user.

18. The method of claim 14, wherein:
    the communications comprise audio communications; and
    modifying the communications comprises adjusting the audio communications to increase the communications' prominence.

19. The method of claim 14, wherein:
    the communications comprise video communications; and
    modifying the communications comprises adjusting the video communications to increase the communications' prominence.

20. The method of claim 19, wherein adjusting the video communications comprises adjusting the size of the video communications.

21. The method of claim 19, wherein adjusting the video communications comprises adjusting the position of the video communications.

22. The method of claim 19, wherein adjusting the video communications comprises disguising a user portrayed in the video communications.

23. A system for providing communications based on video games, the system comprising:
    a user device operative to provide communications to a user; and
    a server in communication with the user device and operative to:

monitor an aspect of a video game played by the user and other users;

monitor communications between the user and the other users while simultaneously providing the video game to the user and the other users, the communications comprising at least one of a non-video game event and a video game event;

determine if the non-video game event has occurred within the monitored communications;

determine if the video game event has occurred within the monitored communications;

provide a video game input in response to determining that the video game event has occurred; and modify a characteristic of the communications from the other users to the user based on the monitored aspect of the video game.

24. The system of claim 23, wherein:

the communications comprise audio communications; and the server is further operative to adjust the audio communications to increase its prominence to the user.

25. The system of claim 23, wherein:

the communications comprise video communications; and the server is further operative to adjust the video communications to increase its prominence to the user.

26. A method for facilitating video games amongst multiple users, the method comprising:
  providing a video game;
  monitoring activity of at least one user device while providing the video game;
  monitoring communications between the at least one user device and at least another user while simultaneously providing the video game, the communications comprising at least one of a non-video game event and a video game event;
  determining if the non-video game event has occurred within the monitored communications;
  determining if the video game event has occurred within the monitored communications;
  determining, based on the monitoring, if a user is attempting to cheat by communicating with other users; and
  providing a video game input in response to determining that the video game event has occurred and the user is not attempting to cheat.

27. The method of claim 26, wherein monitoring activity comprises monitoring all keyboard inputs.

28. The method of claim 26, wherein monitoring activity comprises monitoring all microphone inputs.

29. The method of claim 26, wherein monitoring activity comprises monitoring all active applications.

30. The method of claim 26, further comprising:
  blocking any user that is attempting to cheat from the video game.

31. The method of claim 7, wherein
  the conversation is a part of the communication.

* * * * *